(12) United States Patent
Burrowes et al.

(10) Patent No.: US 11,643,539 B2
(45) Date of Patent: May 9, 2023

(54) FIRE RESISTANT RUBBER COMPOSITIONS AND HOSE

(71) Applicant: ContiTech USA, Inc., Fairlawn, OH (US)

(72) Inventors: Anh Burrowes, North Canton, OH (US); John Anthony Brookes, Chorley (CN); Jenny Zhaoxia Yu, Shanghai (CN)

(73) Assignee: ContiTech USA, Inc., Fairlawn, OH (US)

( * ) Notice: Subject to any disclaimer, the term of this patent is extended or adjusted under 35 U.S.C. 154(b) by 244 days.

(21) Appl. No.: 17/104,853

(22) Filed: Nov. 25, 2020

(65) Prior Publication Data

US 2022/0162433 A1    May 26, 2022

(51) Int. Cl.
*C08L 23/28* (2006.01)
*B32B 25/04* (2006.01)
(Continued)

(52) U.S. Cl.
CPC .............. *C08L 23/286* (2013.01); *B32B 1/08* (2013.01); *B32B 25/042* (2013.01); *B32B 25/14* (2013.01);
(Continued)

(58) Field of Classification Search
CPC ....... C08L 23/286; B32B 1/08; B32B 25/042; B32B 25/14; B32B 2264/1027; B32B 2264/1021; B32B 2264/104; B32B 2264/108; B32B 2597/00; F16L 11/081; F16L 11/085; F16L 11/125
See application file for complete search history.

(56) References Cited

U.S. PATENT DOCUMENTS

| 4,194,536 A | 3/1980 | Stine et al. |
| 5,937,911 A * | 8/1999 | Kodama ........... B32B 1/08 138/124 |

(Continued)

OTHER PUBLICATIONS

Khorova et al., "Effect of the structure of hydrogenated butadiene-nitrile rubber on the resistance to aggressive media and high temperatures" 2016, Procedia Engineering, vol. 152, pp. 556-562. (Year: 2016).*

*Primary Examiner* — Craig M Schneider
*Assistant Examiner* — David R Deal

(57) ABSTRACT

Hoses include a tube, a reinforcement layer disposed outwardly from the tube, and a cover layer disposed outwardly from the reinforcement layer. The cover layer may be based on a first elastomeric blend of a first chlorinated polyethylene and chlorosulphonated polyethylene, a first flame-resistant composition, and a peroxide/sulfur curing system. The tube may be based upon a second elastomeric blend of a second chlorinated polyethylene and ethylene vinyl acetate rubber, a second flame-resistant composition, and a peroxide curing system. The first flame-resistant package and the second flame-resistant package includes one or more ingredients selected from the group consisting of antimony oxide, zinc molybdate/magnesium silicate complex, magnesium aluminum hydroxy carbonate, and aluminum trihydroxide. In some aspects, the hoses meet the testing performance requirements of EN 45545-2, HL2/R22 category standard, and EN854 type 2TE standard.

7 Claims, 1 Drawing Sheet

(51) Int. Cl.
  *B32B 25/14* (2006.01)
  *B32B 1/08* (2006.01)
  *F16L 11/08* (2006.01)
  *F16L 11/12* (2006.01)

(52) U.S. Cl.
  CPC ........... *F16L 11/081* (2013.01); *F16L 11/085* (2013.01); *F16L 11/125* (2013.01); *B32B 2264/104* (2013.01); *B32B 2264/108* (2013.01); *B32B 2264/1021* (2020.08); *B32B 2264/1027* (2020.08); *B32B 2597/00* (2013.01)

(56) References Cited

U.S. PATENT DOCUMENTS

| | | | |
|---|---|---|---|
| 6,006,731 A | 12/1999 | Uzkan | |
| 6,576,311 B2 * | 6/2003 | Noguchi | C08L 27/16 428/421 |
| 6,926,038 B1 * | 8/2005 | Cook | B29C 66/71 138/124 |
| 7,754,808 B2 | 7/2010 | Goossens | |
| 8,479,777 B2 | 7/2013 | Weil et al. | |
| 8,800,604 B2 | 8/2014 | Sont et al. | |
| 2005/0059764 A1 * | 3/2005 | Beck | B32B 25/10 524/495 |
| 2007/0194482 A1 * | 8/2007 | Douglas | B32B 27/32 264/173.14 |
| 2010/0018600 A1 * | 1/2010 | Crouse | F16L 11/125 138/137 |
| 2010/0021665 A1 * | 1/2010 | Jackson | B32B 27/308 138/137 |
| 2010/0260991 A1 * | 10/2010 | Subramanian | B32B 27/40 428/424.7 |
| 2012/0186684 A1 * | 7/2012 | Giovannetti | B29D 23/001 138/137 |
| 2013/0291989 A1 * | 11/2013 | Gray | F16L 11/083 138/137 |
| 2014/0069546 A1 * | 3/2014 | McNab | F16L 57/04 138/140 |
| 2015/0337710 A1 | 11/2015 | Cook | |
| 2016/0305581 A1 * | 10/2016 | Fauble | B32B 1/08 |
| 2018/0080586 A1 * | 3/2018 | Berger | B32B 25/08 |

\* cited by examiner

FIRE RESISTANT RUBBER COMPOSITIONS AND HOSE

FIELD

The field to which the disclosure generally relates to hoses and particularly to high performance, reinforced hoses which are useful railway applications. More specifically, the present disclosure relates to reinforced railway coolant hoses which meet textile reinforced hydraulic hose EN854 type 2TE standard as well as the EN 45545-2 HL2/R22 category European railway standard for fire safety.

BACKGROUND

This section provides background information to facilitate a better understanding of the various aspects of the disclosure. It should be understood that the statements in this section of this document are to be read in this light, and not as admissions of prior art.

Rubber hose is used for material transfer and fluid power applications, in a broad variety of application. Hose used in some transportation vehicles are required to meet fire resistance standards which have become increasingly stringent. The most stringent standards apply to hose used on railway passenger trains, in particular trains that travel substantially through tunnels. One such standard is the EN 45545-2 European railway standard for fire safety.

The EN45545-2 standard requires railway hose meet certain stringent requirements, such as the materials generate very low smoke density during burning, be self-extinguishing when on fire, have very high limiting oxygen index (LOI), have very high flammability temperature, only emit gasses with very low toxicity, fire retardants be halogen-free and heavy-metal free, and be electrically isolating.

Concurrently, the railway hose must comply with the various conventional design requirements, such as listed in relevant railway standards including the textile reinforced hydraulic hose EN854 type 2TE standard. Hose performance includes such factors as burst pressure, cold flexibility, oil resistance, hot air resistance, ozone resistance, and structural integrity of various adhered layers. It is generally recognized in the art that the more fire retarding additives one mixes into the rubber in an attempt to meet fire standards, the worse the physical properties become.

Thus, there is an ongoing goal to use materials to form railway hose which meet stringent standards for fire safety, while also meeting general hose performance standards, and such need is met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a some embodiments of the disclosure, a hose includes a tube, a reinforcement layer disposed outwardly from the tube, and a cover layer disposed outwardly from the reinforcement layer, where the cover layer is based upon an elastomeric blend of chlorinated polyethylene and chlorosulphonated polyethylene, a flame-resistant composition, and a peroxide/sulfur curing system. In some aspects, the cover layer meets testing performance requirements of the EN 45545-2, HL2/R22 category standard, and the EN854 type 2TE standard.

The chlorinated polyethylene and the chlorosulphonated polyethylene may be incorporated in the elastomeric blend in a ratio of from 3:1 parts by weight to 1:3 parts by weight. The cover layer may further include carbon black in an amount of from about 5 phr to about 50 phr, and silica. In some aspects, the cover layer includes the flame-resistant package in an amount of from about 50 phr to about 70 phr. The flame-resistant package may include one or more ingredients selected from the group consisting of antimony oxide, zinc molybdate/magnesium silicate complex, magnesium aluminum hydroxy carbonate, and aluminum trihydroxide.

In a some other embodiments of the disclosure, hose include a tube, a reinforcement layer disposed outwardly from the tube, and a cover layer disposed outwardly from the reinforcement layer, where the tube comprises an elastomeric blend of chlorinated polyethylene and ethylene vinyl acetate rubber, a flame-resistant composition, and a peroxide curing system. According to some aspects, the tube meets testing performance requirements of the EN 45545-2, HL2/R22 category standard, and the EN854 type 2TE standard.

The chlorinated polyethylene and the ethylene vinyl acetate rubber are incorporated in the elastomeric blend in a ratio of from 3:1 parts by weight to 1:3 parts. The tube may further include carbon black in an amount of from about 5 phr to about 50 phr, and silica. In some aspects, the cover layer includes the flame-resistant package in an amount of from about 50 phr to about 70 phr. The flame-resistant package may include one or more ingredients selected from the group consisting of antimony oxide, zinc molybdate/magnesium silicate complex, magnesium aluminum hydroxy carbonate, and aluminum trihydroxide.

In yet other embodiments according to the disclosure, some hoses may include a tube, a reinforcement layer disposed outwardly from the tube, and a cover layer disposed outwardly from the reinforcement layer. The cover layer is based on a first elastomeric blend of a first chlorinated polyethylene and chlorosulphonated polyethylene, a first flame-resistant composition, and a peroxide/sulfur curing system; and, The tube is based upon a second elastomeric blend of a second chlorinated polyethylene and ethylene vinyl acetate rubber, a second flame-resistant composition, and a peroxide curing system. In some aspects, the hose meets testing performance requirements of EN 45545-2, HL2/R22 category standard, and EN854 type 2TE standard.

The first flame-resistant package and the second flame-resistant package includes one or more ingredients selected from the group consisting of antimony oxide, zinc molybdate/magnesium silicate complex, magnesium aluminum hydroxy carbonate, and aluminum trihydroxide.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
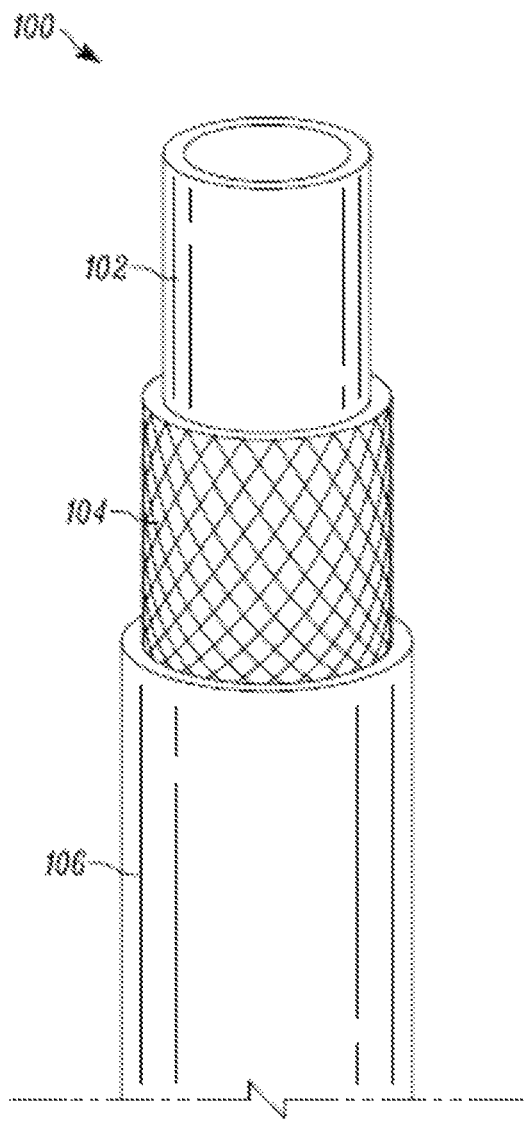
FIG. 1 illustrates in perspective view, a hose according to some aspects of the disclosure; and, FIG. 2 depicts in perspective view, another hose according to some aspects of the disclosure.

Some hose embodiments according to the disclosure have the structure shown in FIG. 1. The hose 100 is composed of at least a tube 102, reinforcing layer 104, and outer cover layer 106. In some aspects, the outer cover layer 106 is formed from a chlorinated polyethylene/chlorosulphonated polyethylene elastomeric blend mixed with several fire-retardant and smoke suppressant ingredients, as well as various optional ingredients. Also, in some aspects of the disclosure the tube 102 is formed from an ethylene vinyl acetate rubber/chlorinated polyethylene elastomeric blend mixed with several fire-retardant and smoke suppressant ingredients, as well as various optional ingredients. Cross-linking of the elastomeric blend mixtures may take place via vulcanization with sulfur, peroxides, or mixtures thereof.

The elastomeric blends useful in forming the inner tube 102 and/or cover layer 106 may be admixed with from about 5 to about 100 phr, of fillers, such as, carbon black, calcium carbonate, talc, magnesium oxide, clay, and silica, or mixtures of the foregoing. Other conventional additives, process and extender oils, antioxidants, waxes, pigments, plasticizers, softeners and the like may be added according to common rubber processing practice without departing from the disclosure. For example, in some embodiments, the elastomeric blends may also contain from about 0.5 to about 2.5 phr of an antiozonant or antioxidant, and up to about 30 phr of a plasticizer, or mixture of plasticizers. According to some embodiments, non-limiting examples of plasticizers which may be incorporated in the elastomeric blends include diallyl phthalate, trioctyl trimellitate, epoxidized soybean oil, 2-ethylhexyldiphenyl phosphate, trioctylphosphate (TOF), triphenylphosphate, tricresylphosphate, and the like.

Also, in some embodiments, the amount of carbon black is from about 5 phr to about 50 phr, and the amount of silica is from about 5 phr to about 15 phr. The silica believed to be helpful for char-forming. However, silica is primarily used as the reinforcing filler, giving control over the modulus and increasing the tensile strength of the rubber composition. Silica is inert to fire, so it does not contribute to smoke as carbon black does.

Referring again to FIG. 1, the reinforcing layer 104 constituting the hose 100 is not particularly limited, but like the reinforcing layer of a conventional hose may be one or more layers of a yarn produced from a vinylon fiber, rayon fiber, hemp fiber, polyester fiber, polyvinyl acetate fiber, nylon fiber, aramid fiber, natural fiber, etc. or a metal wire or metal alloy wire etc. braided, wrapped in a spiral, or wrapped in a plurality of spiraled layers wound in counter directions.

When used in cover layer 106, the relative amounts of chlorinated polyethylene and chlorosulphonated polyethylene may be any suitable ratio to form the elastomeric blend, for example, a ratio of from about 3:1 parts by weight to about 1:3 parts by weight. Likewise, when used in tube 102, the relative amounts of chlorinated polyethylene and ethylene vinyl acetate rubber may be any suitable ratio to form the elastomeric blend, for example, a ratio of from about 3:1 parts by weight to about 1:3 parts by weight. It is within the scope of the disclosure that either one of the cover layer 106, or tube 102, may be formed of conventional elastomers, including, but not limited to, polychloroprene, a nitrile rubber/PVC rubber blend, PVC rubber, nitrile rubber, epichlorohydrin rubber, hydrogenated nitrile rubber, fluoroelastomer, styrene-butadiene rubber, and the like, or any combination thereof.

The cover layer elastomeric blend and/or tube elastomeric blend is/are admixed with a flame-resistant package including the several fire-retardant and smoke suppressant ingredients. Some non-limiting examples of fire-retardant and smoke suppressant ingredients include antimony oxide, zinc molybdate/magnesium silicate complex, magnesium aluminum hydroxy carbonate, aluminum trihydroxide, and the like. The weight amount of the flame-resistant package incorporated may be from about 40 phr to about 80 phr, or from about 50 phr to about 70 phr.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured.

Figure 2:
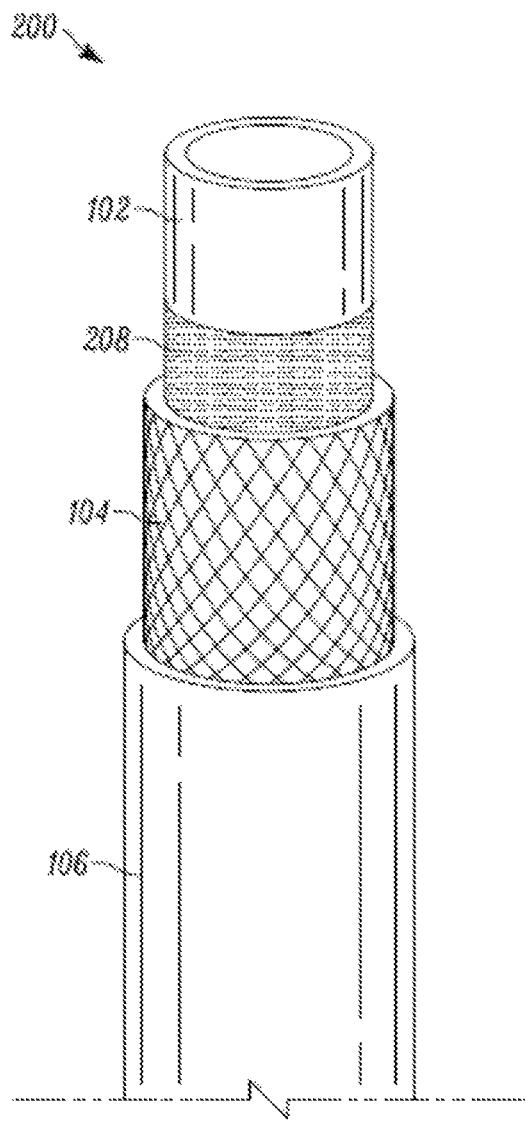

In another aspect of the disclosure, some hose embodiments have the structure shown in FIG. 2. The hose 200 includes an inner tube 102, reinforcing layer 104, outer cover 106, similar to hose 100 described above, and further includes layer 208, which may be a ply reinforcement layer, or a friction layer, or a bonding layer, or backing layer, or barrier layer, and layer 208 is disposed between inner tube 102 and reinforcing layer 104. When used as a ply reinforcement layer, it is not particularly limited, but may be produced from a vinylon fiber, rayon fiber, polyester fiber, nylon fiber, fiber from sustainable material, or aramid fiber, etc. in a ply configuration. When used as a barrier layer, it is not particularly limited, but may be produced from nylon, PVDF, THV, and the like.

As described above, each of the reinforcing layers may be formed by spiral winding one or more layers of a yarn or hard steel wire. Reinforcing layers may also be formed from braid or knit reinforcements. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The optional layer 208, when used in some embodiments according to the disclosure, is typically from about 0.5 mm to about 1.3 mm thick, is more typically from about 0.6 mm to about 1.1 mm thick, and in some aspects, will be from about 0.7 mm to about 0.9 mm in thickness. When used as a friction layer, the friction layer may be formed from any suitable curable rubber based composition, containing such rubber as EPDM/EPR sustainable polymer, acrylonitrile butadiene rubber (NBR), hydrogenated NBR, carboxylated NBR, polychloroprene, fluoroelastomer, epichlorohydrin, nitrile, carboxylated nitrile rubber, CPE, CSM, styrene-butadiene rubber (SBR), NBR/PVC blends, or any blends thereof.

The curable rubber employed in the friction layer of some hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as mineral fillers, lignin, and the like. Reinforcing fillers are typically utilized at a level which is within the range of about 20 parts per hundred parts (phr) to about 400 phr. In some embodiments, talc is incorporated in an amount of from about 10 phr to about 60 phr, and such may be included in compositions useful in any layers of the hoses.

Referring again to cover layer 106, in some embodiments according to the disclosure, cover layer 106 has a thickness of from about 1 mm to about 7 mm, from about 1.5 mm to about 5.5 mm, and in some instances, from about 1.7 mm to about 4 mm. In some aspects, the tube 102 has a thickness of from about 1 mm to about 3 mm, from about 1.5 mm to about 2.5 mm, and in some instances, from about 1.7 mm to about 2 mm. Hose embodiments according to the disclosure may have a minimum burst pressure of about 36 bar, or in some cases, 120 bar. Temperature operating range for hose embodiments according to the disclosure may be from about −40° C. to about 125° C. Also, hose embodiments may meet such standards as the textile reinforced hydraulic hose EN854 type 2TE standard, the EN 45545-2 category HL2/R22 European railway standard for fire safety, and/or the EN 5510-2 standard for fire and smoke toxicity.

EXAMPLES

Embodiments of the disclosure illustrated by the following examples that are merely for the purpose of illustration and are not to be regarded as limiting the scope of the disclosure, or the manner in which it can be practiced. Unless specifically indicated otherwise, parts (phr) are given by weight.

In this experiment, rubber formulations were prepared, cured and tested for physical properties. In the procedure used, non-productive rubber formulations were prepared utilizing the ingredients identified in Table 1. Then productive rubber formulations were made by further adding the ingredients identified in Table 1 to the non-productive formulations. The quantities reported in Table 1 are in phr.

TABLE 1

|  | Ex. 1 Tube | Ex. 2 Cover |
|---|---|---|
| Nonproductive Blend | | |
| Chlorinated polyethylene | 75 | 65 |
| Thermoplastic chlorosulphonated polyethylene | 0 | 35 |
| Ethylene vinyl acetate rubber | 25 | 0 |
| Carbon black | 40 | 10 |
| Talc | 0 | 30 |
| Calcium carbonate | 0 | 20 |
| Silica | 10 | 10 |
| Diallyl phthalate | 0 | 10 |
| Epoxidized soybean oil | 0 | 5 |
| Trioctyl trimellitate | 0 | 12 |
| 2-Ethylhexyldiphenyl phosphate | 27 | 0 |
| Magnesium oxide | 10 | 20 |
| Aluminum trihydroxide (0.5 micron) | 30 | 30 |
| Antimony oxide | 12 | 12 |
| Zinc molybdate/magnesium silicate complex | 10 | 5 |
| Polymerized 1,2-dihydro-2,2,4-trimethylquinoline | 0.5 | 0.5 |
| 1,2-Bis(3,5-di-tert-butyl-4-hydroxyhydrocinnamoly) hydrazine | 1 | 1 |
| Magnesium aluminum hydroxy carbonate | 10 | 10 |
| Productive Blend | | |
| Triallylcyanurate (TAC)) | 5 | 5 |
| Butyl 4,4-di(tert-butylperoxy)valerate | 3 | 3 |
| Dicumyl peroxide | 9 | 7 |
| Sulfur | 0 | 0.5 |
| Total | 267.5 | 291 |
| Specific gravity | 1.4924 | 1.6258 |

The productive rubber formulations were subsequently cured and tested for physical properties. The cured rubber formulations were determined to have the physical properties delineated in Table 2.

TABLE 2

| TESTS and STANDARDS | Ex. 1 Tube | Ex. 2 Cover |
|---|---|---|
| EN 45545-2, HL2/R22 category | | |
| Railway hose fire resistance | | |
|   Smoke density | 150 | 165 |
|   Smoke toxicity | <0.3 | 0.22 |
|   Oxygen content % | 35.5 | 36.5 |
| EN 854, type 2TE | | |
| MSHA for cover | | |
|   Flame out (sec) | 0 | 0 |
|   After glow (sec) | 11 | 0 |
| Monsanto flex fatigue, cycles to crack (avg) | +800000 | +800000 |
| Cold flex 24 h/−40° C., | no crack, 6 | no crack, 7 |
| (rating 1 = very flexible to 10 = crack) | | |
| Specific gravity (measured) | 1.4868 | 1.5625 |
| Vol swell, 168 h/100° C./IRM903 | 24.83 | 46.3 |
| Vol swell, 168 h/70° C./dist. H2O | 12.9 | 13.3 |
| Static ozone, 72 h/40° C./100 pph | no crack | no crack |
| Physical Properties | | |
| Original tensile (psi) | 1661 | 1802 |
| Original elongation (%) | 197 | 431 |
| Original 100 modulus (psi) | 945 | 888 |
| Original Shore A | 78 | 80 |
| Rheometer, 75 min/160° C. | | |
|   Min | 4.726 | 3.668 |
|   Max | 55.96 | 28.2 |
|   Tris1 | 1.17 | 0.97 |
|   T90 | 34.98 | 39.57 |
|   S90 | 50.84 | 25.74 |
| Mooney scorch t5, 30 min/121° C. | >30 | >30 |
| Mooney viscosity, ML(1 + 4), 8 min/100° C. | 108.1 | 73.5 |

The above examples passed the testing performance requirements of both the EN 45545-2, HL2/R22 category standard, and the EN854 type 2TE standard. The Ex. 1 tube and Ex. cover are useful for providing a railway hose which meets these two standards, as well. The railway hose may be a railroad air-brake hose or coolant hose. The hose may also be useful for other applications, such as, but not limited to, a sand-brake hose, automotive radiator and heater hose, hydraulic hose, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising a tube, a reinforcement layer disposed outwardly from the tube, and a cover layer disposed outwardly from the reinforcement layer;
wherein the cover layer comprises a first elastomeric blend of a first chlorinated polyethylene and chlorosulphonated polyethylene, a first flame-resistant composition, and a peroxide/sulfur curing system; and,
wherein the tube comprises a second elastomeric blend of a second chlorinated polyethylene and ethylene vinyl acetate rubber, a second flame-resistant composition, and a peroxide curing system.

2. The hose according to claim 1, wherein the first chlorinated polyethylene and the chlorosulphonated polyethylene are incorporated in the first elastomeric blend in a ratio of from 3:1 parts by weight to 1:3 parts by weight, and wherein the second chlorinated polyethylene and the ethylene vinyl acetate rubber are incorporated in the second elastomeric blend in a ratio of from 3:1 parts by weight to 1:3 parts by weight.

3. The hose according to claim 1, wherein each of the cover layer and the tube further comprise carbon black in an amount of from 5 phr to 50 phr, and silica.

4. The hose according to claim 1, wherein the cover layer comprises the first flame-resistant package in an amount of from about 50 phr to about 70 phr.

5. The hose according to claim 1, wherein the first flame-resistant composition comprises one or more ingredients selected from the group consisting of antimony oxide, zinc molybdate/magnesium silicate complex, magnesium aluminum hydroxy carbonate, and aluminum trihydroxide.

6. The hose according to claim 1, wherein the tube comprises the second flame-resistant composition in an amount of from about 50 phr to about 70 phr.

7. The hose according to claim 1, wherein the second flame-resistant composition comprises one or more ingredients selected from the group consisting of antimony oxide, zinc molybdate/magnesium silicate complex, magnesium aluminum hydroxy carbonate, and aluminum trihydroxide.

\* \* \* \* \*